(No Model.)
C. G. PERKINS.
ELECTRIC LAMP.
No. 244,481. Patented July 19, 1881.
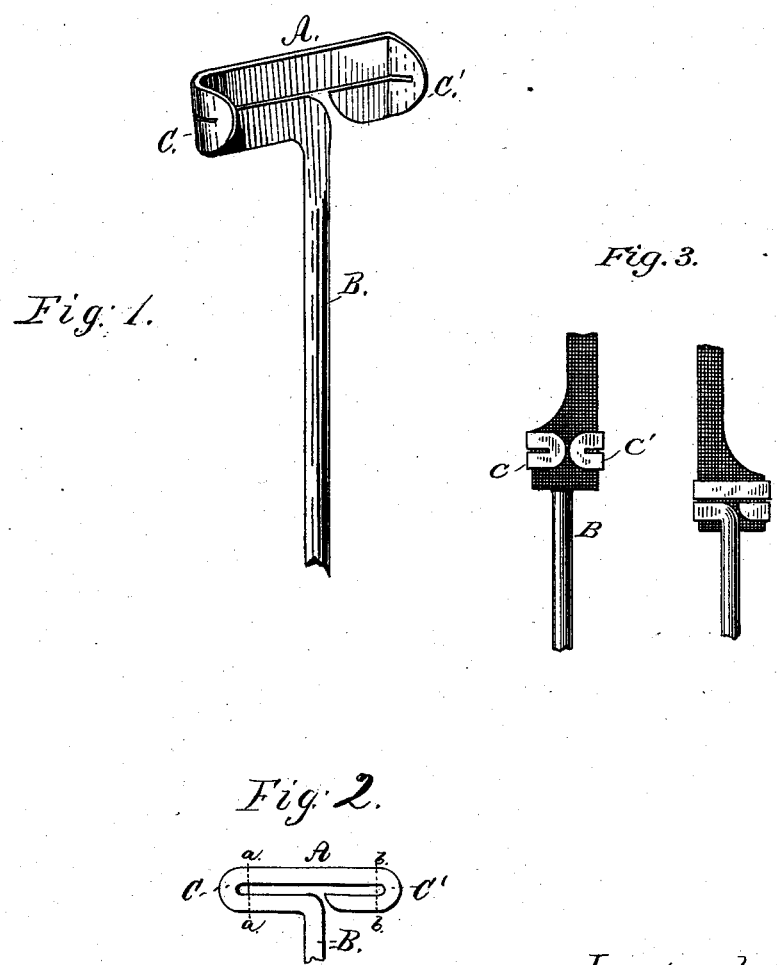
Witnesses
Henry Hine
Sam' Bonnell Jr
Inventor:
Chas. G. Perkins
per Parker W. Page atty.

UNITED STATES PATENT OFFICE.

CHARLES G. PERKINS, OF NEW YORK, N. Y., ASSIGNOR TO THE UNITED STATES ELECTRIC LIGHTING COMPANY, OF SAME PLACE.

ELECTRIC LAMP.

SPECIFICATION forming part of Letters Patent No. 244,481, dated July 19, 1881.

Application filed April 4, 1881. (No model.)

*To all whom it may concern:*

Be it known that I, CHAS. G. PERKINS, of the city, county, and State of New York, have invented certain new and useful Improvements in Electric Lamps, of which the following is a full, clear, and exact description, reference being had to the drawings accompanying and forming a part of the specification.

The delicate and fragile nature of the carbon strips employed in the incandescent lamps as now made renders it impracticable to unite them with the conductors by twisting or bending the latter about their ends, and from the necessarily small diameter of the wires it is equally impracticable to flatten their ends out sufficiently to infold the enlarged extremities of the carbons. It has therefore been customary to employ some kind of clamp to secure good electrical connection between the two. These I dispense with by preparing a copper or platinum wire as follows: The wire, by successive bendings, is brought into the form of a T, and the cross-piece is then flattened out, by rolling or pounding, into a thin strip, which is designed to be of such length that its ends may be wrapped about the end of a carbon and gently compressed into contact therewith by pinchers.

The accompanying drawings are referred to for a better understanding of the invention.

Figure 1 is an enlarged view of a wire bent into shape and rolled ready for attachment to the carbon, and Fig. 2 represents the same before being flattened, and is designed to illustrate the method of bending. Fig. 3 is an illustration of the method of uniting the bent wires to the enlarged ends of a carbon conductor.

The wire is bent first at right angles to the part B. At C it is doubled back on itself and is carried at right angles to B to C', when it is again doubled back, and is finally cut off close to the bend in the main stem B. A T-shaped stem is thus formed, the cross of which is flattened out by proper means and its ends C C' bent up at right angles on the lines *a a b b*, the space between which is to be occupied by the broadened end of a carbon conductor, which, when in place, is secured by bending the ends C C' down upon it.

One of the principal advantages of this method of mounting the carbons results from the peculiar form given to the supporting-conductors—viz., that of a T—by which only the lowest portion of the enlarged end of the carbon may be in contact with the metal, so that all heating of the connections is avoided.

To complete the electrical connection it may be desirable to electro-deposit metal on and around the joint; but to this I lay no claim, as it forms no part of my present invention.

Having thus described my invention, what I claim as new, and desire to secure by Letters Patent, is—

1. The combination, in an electric incandescent lamp, of a continuous carbon conductor having enlarged or broadened ends with metallic conductors brought by successive bendings into the form of a T, the cross-pieces being flattened and caused to embrace the ends of the said carbon, substantially as and for the purposes set forth.

2. In an incandescent electric lamp, the metallic wires B, brought by successive bendings into the form of a T, the cross-pieces of which are flattened for embracing the ends of a carbon conductor, as described.

In testimony whereof I have hereto set my hand this 1st day of April, 1881.

CHARLES G. PERKINS.

Witnesses:
HENRY HINE,
W. J. VAN PELT, Jr.